US010933975B2

(12) United States Patent
Ratti

(10) Patent No.: US 10,933,975 B2
(45) Date of Patent: Mar. 2, 2021

(54) VARIABLE GEOMETRY AIRFRAME FOR VERTICAL AND HORIZONTAL FLIGHT

(71) Applicant: BIO CELLULAR DESIGN AERONAUTICS AFRICA SA, Casanearsbore (MA)

(72) Inventor: Jayant Ratti, Atlanta, GA (US)

(73) Assignee: BIO CELLULAR DESIGN AERONAUTICS AFRICA SA, Casanearsbore (MA)

(*) Notice: Subject to any disclaimer, the term of this patent is extended or adjusted under 35 U.S.C. 154(b) by 353 days.

(21) Appl. No.: 15/385,573

(22) Filed: Dec. 20, 2016

(65) Prior Publication Data

US 2018/0170517 A1 Jun. 21, 2018

(51) Int. Cl.
*B64C 3/54* (2006.01)
*B64C 39/02* (2006.01)
*B64C 29/00* (2006.01)
*B64D 41/00* (2006.01)

(52) U.S. Cl.
CPC .......... *B64C 3/546* (2013.01); *B64C 29/0025* (2013.01); *B64C 29/0033* (2013.01); *B64C 39/024* (2013.01); *B64C 2201/021* (2013.01); *B64C 2201/042* (2013.01); *B64C 2201/088* (2013.01); *B64C 2201/102* (2013.01); *B64D 2041/005* (2013.01)

(58) Field of Classification Search
CPC .... B64C 3/38; B64C 3/40; B64C 3/54; B64C 3/546; B64C 3/56; B64C 29/02; B64C 39/024
See application file for complete search history.

(56) References Cited

U.S. PATENT DOCUMENTS

| | | | | | |
|---|---|---|---|---|---|
| 2,260,316 A | * | 10/1941 | Harris | ....................... | B64C 3/54 244/218 |
| 3,473,761 A | * | 10/1969 | Chutter | ..................... | B64C 1/34 244/119 |
| 3,672,608 A | * | 6/1972 | Gioia | ........................ | B64C 3/54 244/218 |
| 3,980,257 A | * | 9/1976 | Koch | ........................ | B64C 3/54 244/218 |
| 5,201,482 A | * | 4/1993 | Ream | ................... | B64D 17/025 244/145 |
| 5,474,257 A | * | 12/1995 | Fisher | ................... | B64C 31/028 244/49 |
| 5,573,207 A | * | 11/1996 | Germain | .............. | B64D 17/025 244/142 |
| 6,098,927 A | * | 8/2000 | Gevers | ...................... | B64C 1/00 244/123.8 |

(Continued)

*Primary Examiner* — Michael H Wang
(74) *Attorney, Agent, or Firm* — Leason Ellis LLP

(57) ABSTRACT

A hybrid wing autonomous aircraft having, an airframe, at least one hybrid wing member having an airframe end and an extended end, and having leading and trailing edges and a plurality of control structures, the airframe end coupled to the airframe, and the extended end further configured with a wing extension device, the wing extension device configured to extend a supplemental lifting surface from the extended end, an airframe actuator configured to cause the extension end of the hybrid wing member to move from a first position relative to the airframe to a second position relative to the airframe, wherein the second position is greater in distance from the airframe than the first position.

13 Claims, 5 Drawing Sheets

(56) References Cited

U.S. PATENT DOCUMENTS

| | | | | |
|---|---|---|---|---|
| 6,322,021 B1* | 11/2001 | Fisher | B64C 31/024 | 244/137.3 |
| 6,347,769 B1* | 2/2002 | To | B63B 1/248 | 244/219 |
| 6,487,959 B2* | 12/2002 | Perez | F15B 15/103 | 92/92 |
| 6,622,974 B1* | 9/2003 | Dockter | B64C 3/44 | 244/219 |
| 6,834,835 B1* | 12/2004 | Knowles | B64C 3/54 | 244/198 |
| 6,837,463 B2* | 1/2005 | Lynn | B64D 17/02 | 244/146 |
| 8,651,431 B1* | 2/2014 | White | B64C 3/40 | 244/218 |
| 9,555,873 B1* | 1/2017 | Alley | B64C 3/40 | |
| 2002/0074452 A1* | 6/2002 | Ingram | B64C 3/40 | 244/7 B |
| 2004/0069907 A1* | 4/2004 | Dockter | B64C 3/46 | 244/218 |
| 2005/0274844 A1* | 12/2005 | Stuhr | B64C 3/40 | 244/46 |
| 2006/0118675 A1* | 6/2006 | Tidwell | B64C 3/40 | 244/123.1 |
| 2009/0072094 A1* | 3/2009 | Sanderson | B63G 8/26 | 244/218 |
| 2012/0085858 A1* | 4/2012 | Seifert | B64C 3/42 | 244/46 |
| 2015/0097087 A1* | 4/2015 | Sakurai | B64C 9/00 | 244/201 |
| 2015/0151830 A1* | 6/2015 | Xi | B64C 3/44 | 244/47 |
| 2016/0176502 A1* | 6/2016 | Snook | B64C 3/40 | 244/218 |
| 2017/0291686 A1* | 10/2017 | Alley | B64C 3/40 | |

* cited by examiner

VARIABLE GEOMETRY AIRFRAME FOR VERTICAL AND HORIZONTAL FLIGHT

FIELD OF THE INVENTION

The present invention relates to morphing wing designs for use with aircraft designed to engage in both vertical takeoff and landing (VTOL) operations as well as forward flight operations. The airframe includes wings configured to control the direction of the leading edge of a wing as well as increase the surface area of the wing during low speed transitions to and from VTOL to normal flight.

BACKGROUND OF THE INVENTION

Typically, fixed wing aircraft are extremely efficient for long-distance flight applications and maintain a simple control scheme. However, fixed wing aircraft lack multi-directional maneuverability and require significant runway and landing infrastructure. Rotor-based aircraft overcome these drawbacks but are limited in forward speed and endurance.

Existing VTOL aircraft usually have large power plants and fuel requirements. For instance, many VTOL aircraft use ducted fan arrangements to implement thrust vectoring to maintain aircraft stability during the transition from vertical to horizontal flight.

Therefore, what is needed is an aircraft that yields advantages from both aircraft type in an airframe that is suitable for unmanned, small form factor vehicles.

SUMMARY OF THE INVENTION

In one particular embodiment, the present invention is directed to an airframe equipped with at least one hybrid wing configured to alter its surface area and leading edge position in order to allow for a stable transition from vertical takeoff and landing (VTOL) flight and forward flight (FF). With specific reference to an un-manned aerial vehicle, the present invention is directed to an aircraft configured for both VTOL and FF flight. By using pivoting airfoils, or wings, the aircraft is able to reduce the amount of leading edge presented to the direction of travel, thus presenting a smaller cross section during vertical takeoff and landings.

Once the aircraft has reached a suitable height and position, the wings pivot or other wise move to align the leading edges of the wings with the direction of forward flight. In order to provide sufficient lift at slow speeds during the transition, the wings are further configured to increase the wing surface area by extruding or expanding low speed wing extensions from the wings. The low speed wing extensions are, in one arrangement, inflatable or air-ram based fabric sleeves that increase the surface area of the wing and provide more lift at low to medium speeds. Once the aircraft gains sufficient speed, the wing extensions are retracted and the aircraft is able to engage in forward flight as a fixed wing aircraft.

The unique and advanced configuration provided herein, offers significant advantages over conventional airframes and allows for the minimization of negative drag coefficients during flight, maximizing of usable ranges and minimizing of energy requirements.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF CERTAIN EMBODIMENTS OF THE INVENTION

By way of overview and introduction, the present invention is directed to a vertical takeoff and landing (VTOL) device in the form of an unmanned aerial vehicle (UAV) that implements a hybrid wing design that allows for improved VTOL performance as well as improved forward flight (FF) performance. The UAV uses a folding and extensible wing configuration to improve lift and drag performance relative to fixed wing or rotor winged aircraft. Those possessing an ordinary level of skill in the art will appreciate that the present embodiments have a broader applicability in the field of air-borne vehicles. Particular configurations discussed in examples can be varied and are cited to illustrate the principles of exemplary embodiments With reference to FIGS. 1 and 2, the present invention is directed to an airframe 101. In a particular arrangement, the airframe 101 is formed out of carbon fiber or a similar material having a high strength to weight ratio. In another configuration, the airframe 101 is formed or machined or cast materials, such as epoxy, resins, foam metal and other materials, or constructed using additive or subtractive 3D printing techniques. The airframe 101 has dimensions suitable for aerodynamic flight. In one configuration, the airframe 101 is arranged in a flying wing configuration. In an alternative configuration, airframe 101 has a lifting body configuration.

Figure 1:
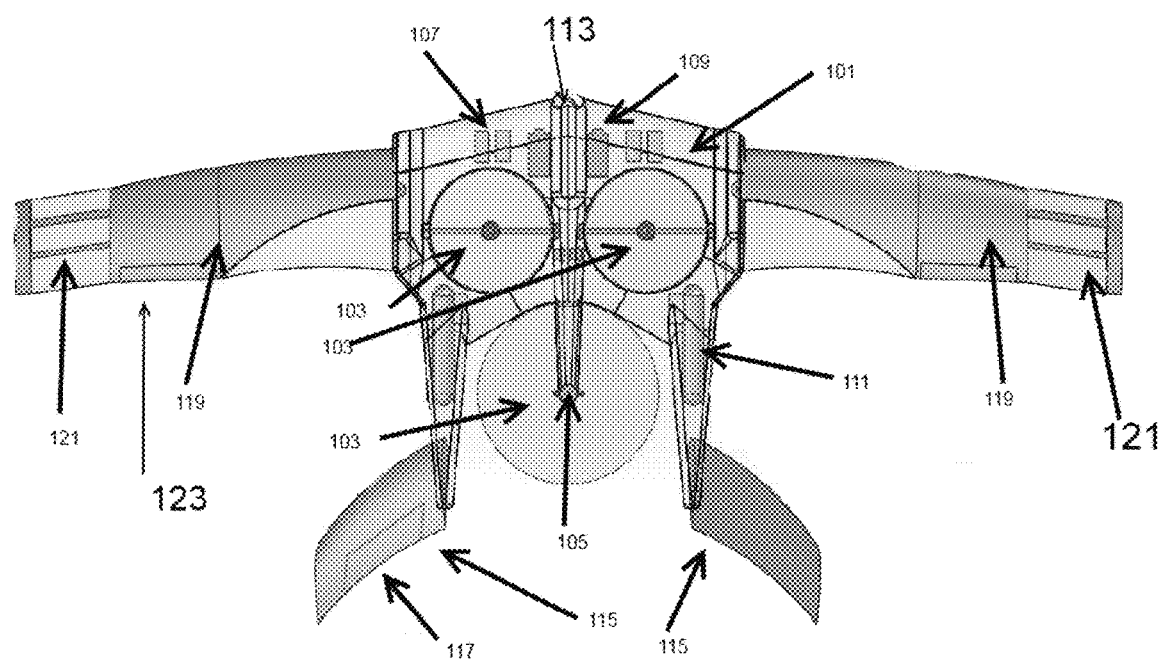
FIG. 1 is top view of the airframe in a first configuration in accordance with one embodiment of the invention.

As shown in FIG. 1, the air frame 101 is equipped with at least one power plant 103. The power plant 103 in the illustrated configuration provides the air frame with vertical and forward thrust. As such the air frame 101 is suitable for ascending and descending within the vertical plane. In one particular arrangement, the power plant 103 is a rotor driven ducted fan assembly that includes interconnected linkage assemblies necessary to achieve vertical flight.

In the particular configuration shown, two or more rotor blades may be provided in each ducted fan assembly connected to the motor 105 to provide lift to the airframe. Although FIG. 1 sets forth three fan assemblies 103, any number of fan assemblies could be used consistent with this disclosure. For example, a single fan assembly could be used. Alternately, three or more fan assemblies could be interconnected via one or more duct linkage assemblies. Furthermore, those skilled in the art will appreciate that the number of rotor blades depends on the configuration and capacities of the airframe. The rotors of the power plant 103 are, in one embodiment, driven by a motor 105. The motor 105 is preferably an electric motor, e.g. a brushless direct current (DC) motor powered by a separately provided battery 107.

The battery 107 is in one arrangement, a lithium-ion power source. However, in alternative configurations other battery technologies, such as lithium-polymer, and/or lithium aluminum hydride batteries are used. Any other type of battery can be used as long as it provides sufficient power to drive the motor 105 and sufficient power density to provide an extended operating time period.

In the alternative, the motor 105 can be powered by hydrogen fuel cells 109 configured to output the necessary electrical power. In one arrangement, hydrogen fuel cells 109 are supplied with hydrogen ($H_2$) from hydrogen storage tanks 111 incorporated into the airframe 101. In a further alternative arrangement, the hydrogen storage tanks 111 can be located on the exterior of the airframe 101. The hydrogen storage 111 tanks in one embodiment include the linkages, valves, controls, and sensors necessary to provide the fuel cells 109 with hydrogen fuel. Still further, both batteries and fuel cells can be provided where the batteries take over when the fuel cells are exhausted as a safety measure.

The airframe 101 of the present invention is configured to use the battery 107 or hydrogen fuel cell 109 to provide all of the necessary power to support during flight the airframe and an extra component of the airframe, such as a payload 113. Here, the payload can be any removable or non-removable structure or apparatus. For example, in one arrangement the payload 113 is an avionics suite. An avionics payload 113 may include, for example, control systems, wireless remote control interfaces, AD/AHRS, Autopilot, GPS receiver & Antenna, and Data Link Transceiver & antenna, a battery or backup-battery source, and/or other flight-enabling systems. In an alternative arrangement, the payload is a releasable payload configured to separate from the airframe 101.

As shown, the airframe 101 is equipped with multiple batteries 107 and fuel cells 109. However, in a particular arrangement, a single power source is used to supply power to the power plant 103 as well as any avionics or control suites, actuators or other electrically powered mechanisms.

The airframe 101 is also equipped in specific configurations with vertical tail elements 115 and ruddervators 117 (e.g. combined elevators and rudders). These elements are included to assist in level flight. The airframe 101 of the present invention also includes landing gear or legs that allow for the airframe 101 to land on a cleared or partially cleared landing area. For example, the airframe 101 includes landing legs formed out of deformable plastic or rubber to provide for additional landing shock absorption.

Figures 5A, 5B, 5C:
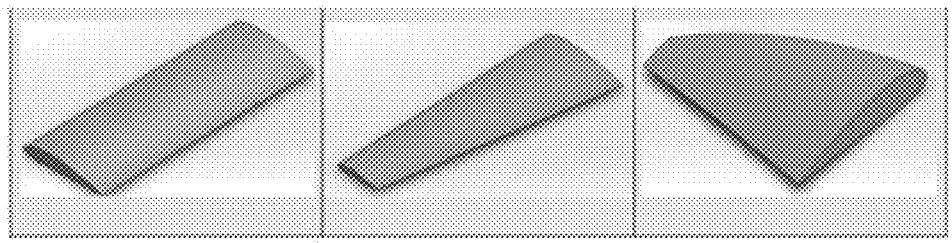
FIGS. 5A-C illustrate different wing configurations.

In accordance with the present invention, the airframe 101 also includes at least one, but preferably two, hybrid wings 119. In one configuration of the present invention, the hybrid wings 119 have a conventional airfoil shape, in which each wing is shaped with a rounded leading edge, followed by a sharp trailing edge with a symmetric curvature of upper and lower surfaces. In the illustrated embodiment of FIG. 1 and the detailed view of FIG. 5A, the hybrid wings 119 have a rectangular wing surface. In alternative constructions, the hybrid wings 119 have elliptical or tapered shapes, as in FIGS. 5B-C.

In one arrangement, the hybrid wing 119 is selected from commonly available wings designs, such as the Eiffel 10, Eppler 377m and NACA 4415 airfoil designs. While the illustration of FIG. 1 provides two (2) hybrid wings, those possessing a requisite level of skill in the art will appreciate that other configurations are possible.

In the illustrated embodiment of FIG. 1, the hybrid wing 119 is formed of laminate material. In the alternative, the hybrid wing 119 is formed of non-laminate material. In a further arrangement, the hybrid wing 119 is formed of a foam material. For instance, the hybrid wing 119 is formed of a soft or rigid foam including expanded polyethylene (EPE), Low Density Polyethylene (LDPE), expanded polystyrene (EPS), or expanded polypropylene (EPP). The foam materials may be formed via a foam injection molding process.

Figure 3:
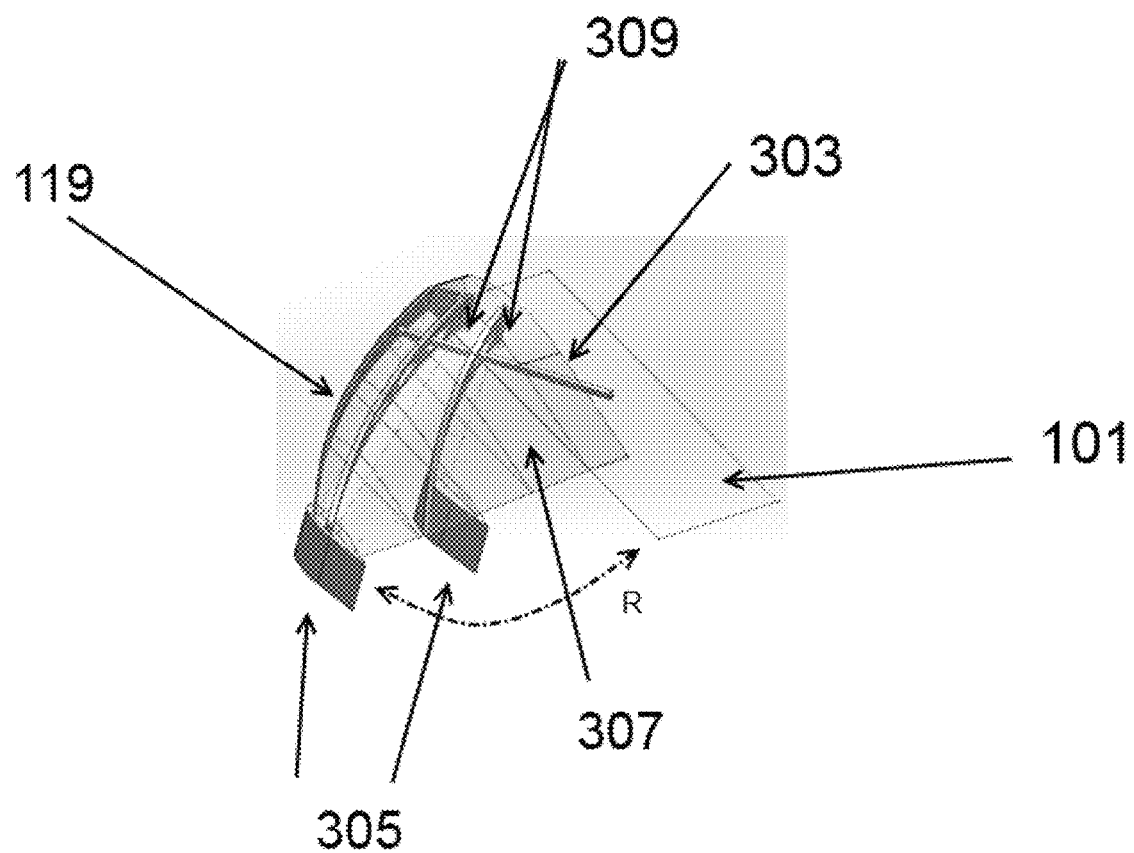
FIG. 3 is a detailed view of one element of the wing of the present invention.

In a further arrangement, the hybrid wing 119 is a forced-air or ram-air structure formed of air retaining cells. In yet a further embodiment, the hybrid wing 119 is formed of a fabric and ribbing structures. In a more detailed view, FIG. 3 illustrates an interior ribbing, structures or control linkages that allows for the direct or wire control of ailerons 123 and other control surfaces.

In a particular arrangement, the hybrid wing 119 also includes at least one of vortex generators, leading-edge slats or flaperons to increase the wing's angle of attack beyond the operational range provided by the shape and dimensions of the hybrid wing 119 design. By including these wing features, the airframe 101 is prevented from stalling when transitioning from a vertical flight mode to a forward flight mode.

At least one of the hybrid wings 119 of the airframe 101 is equipped with a wing extension 121. As shown in its extended state in FIG. 1, the wing extension 121 extends the length and/or surface area of the hybrid wing 119.

Figure 2A:
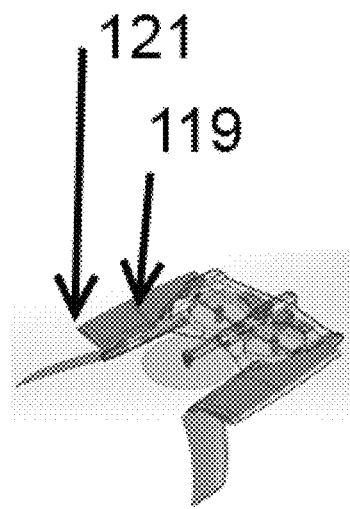
FIG. 2A is a perspective view of the airframe in a second configuration in accordance with one embodiment of the invention.
Figure 2B:
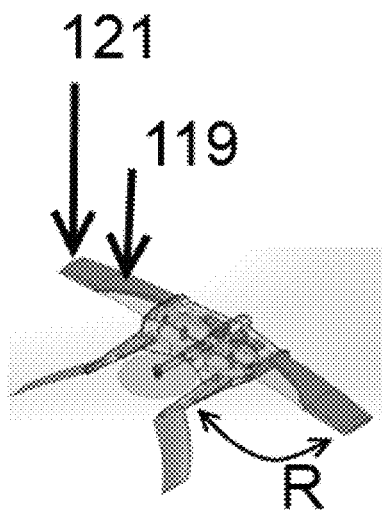
FIG. 2B is a perspective view of the airframe in a third configuration in accordance with one embodiment of the invention.
Figure 2C:
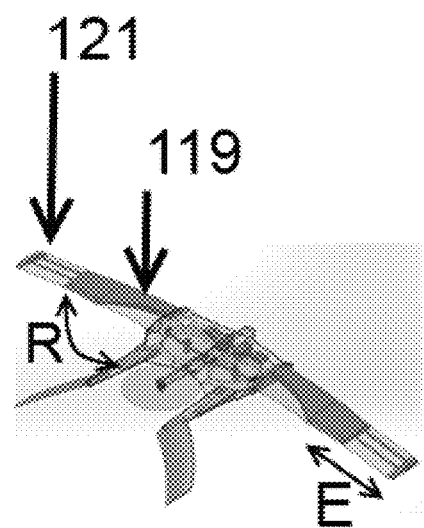
FIG. 2C is a perspective view of the airframe in the first configuration in accordance with one embodiment of the invention.

Turning the FIGS. 2A-C, in operation the hybrid wings 119 are configured to provide additional lift to the airframe during the transition from vertical flight to or from horizontal flight. For instance, when the airframe is preparing to land vertically it must slow significantly in order to allow for a controlled vertical descent. To overcome these problems, the hybrid wing 119 uses two cooperating mechanisms to achieve the performance characteristics necessary.

FIG. 2A details the hybrid wing 119 in a folded configuration. As shown in FIG. 2A, the hybrid wing(s) 119 are kept at a first distance in close proximity to the airframe 101. The folded configuration, as illustrated in FIG. 2A, is used when the airframe 101 is engaged in vertical take offs and landing and utilizes the power plant 103 to provide vertical lift and control to the airframe 101. The transitional period between when the airframe is engaged in complete vertical flight and when the airframe has transition into normal forward flight poses a significant challenge. The airframe 101 is airborne, but lacks the required speed to generate enough lift to engage in forward flight using the airframe 101 and collapsed hybrid wings 119.

To supply sufficient lift, the hybrid wings 119 are configured to expand or pivot, as shown in FIGS. 2B-C and denoted by reference R, such that a far end of the hybrid wing 119 is moved to a distance further away from the airframe 101. The expanded configuration provides fixed wings that supply additional lift to the airframe to enable forward flight.

Turning to the expansion mechanism 303 shown in FIG. 3, the hybrid wing 119 is secured, in part to the airframe though a pivot attachment point that allows the wing to move about the pivot point and extend its free end away from the airframe. In a particular arrangement, an expansion mechanism 303 causes the hybrid wing 119 to pivot about the around point 309 along extension line R, until it has reached maximum extension. For example, the pivot mechanism 303 causes the hybrid wing 119 to move relative to the airframe 101 so that a leading edge of the hybrid wing 119 is presented to the direction of forward movement. In one configuration of the airframe 101 described, a fabric covering 307 expands in response to the movement of the wing expansion mechanism 303. The fabric covering 307 increases the area of the hybrid wing 119 and provides additional lift. In one implementation, the wing expansion mechanism 303 is activated through the use of a processor 402 configured to receive instructions from an operator or controller as in FIG. 4. However, in an alternative arrangement, the wing expansion mechanism 303 is controlled automatically in response to environment factors such as air speed and altitude.

To provide additional lift to the airframe during the transition from vertical to forward flight the hybrid wings 119 are also equipped with extension members 121. In one configuration, the wing extension members 121 are utilized at low and medium speeds (VTOL to −45 mph) to increase the hybrid wing 119 area and achieve greater lift at lower speeds. Hydraulic pistons, springs, levers, or other mechanisms suitable for extending the extension members 121 away from an outermost edge of the hybrid wing 119 can be used. Furthermore, the extension members 121 can be configured to increase the surface area of the wing by causing other extensions, such as in overall wing width or thickness. For example, the extension member 121 is formed of an end cap and at least two extender elements configured to push the end cap away from the airframe 101 along extension line E shown in FIG. 2C. In a particular arrangement, the extension members 121 is a solid or rigid insert that fits within the hybrid wing 119. In an alternative configuration, the extension member 121 is a non-rigid (e.g. textile) ram air construction. For example, the wing extension member 121 is one or more extruding elements encased in rip stop nylon and having interwoven rip stop reinforcement threads sewn into a crosshatch pattern. As used herein, ripstop nylon used to encase the wing extension member may be waterproof, water resistant, fire resistant, or/and have zero porosity.

As shown in FIG. 2C, once the airframe 101 has reached sufficient speed to produce lift using only the airframe and the hybrid wing 119 members, the extension members 121 are retracted into the hybrid wing 119 and the airframe 101 engages in forward flight using lift created by the airframe 101 and the hybrid wings 119. Once the airframe has reached sufficient speed in the configuration shown in FIG. 2C, the members 121 can be retracted so that the airframe reassumes the shape in FIG. 2B. The lifting surfaces are then retracted and folded when the airframe is decelerating for a vertical landing. First the speed is decreased, then the extension members 121 are extended to provide additional lift (as in 2C), once vertical thrust is sufficiently supplied, the wing expansion mechanism causes the hybrid wings 119 to retract to the folded position as in FIG. 2A.

Figure 4:
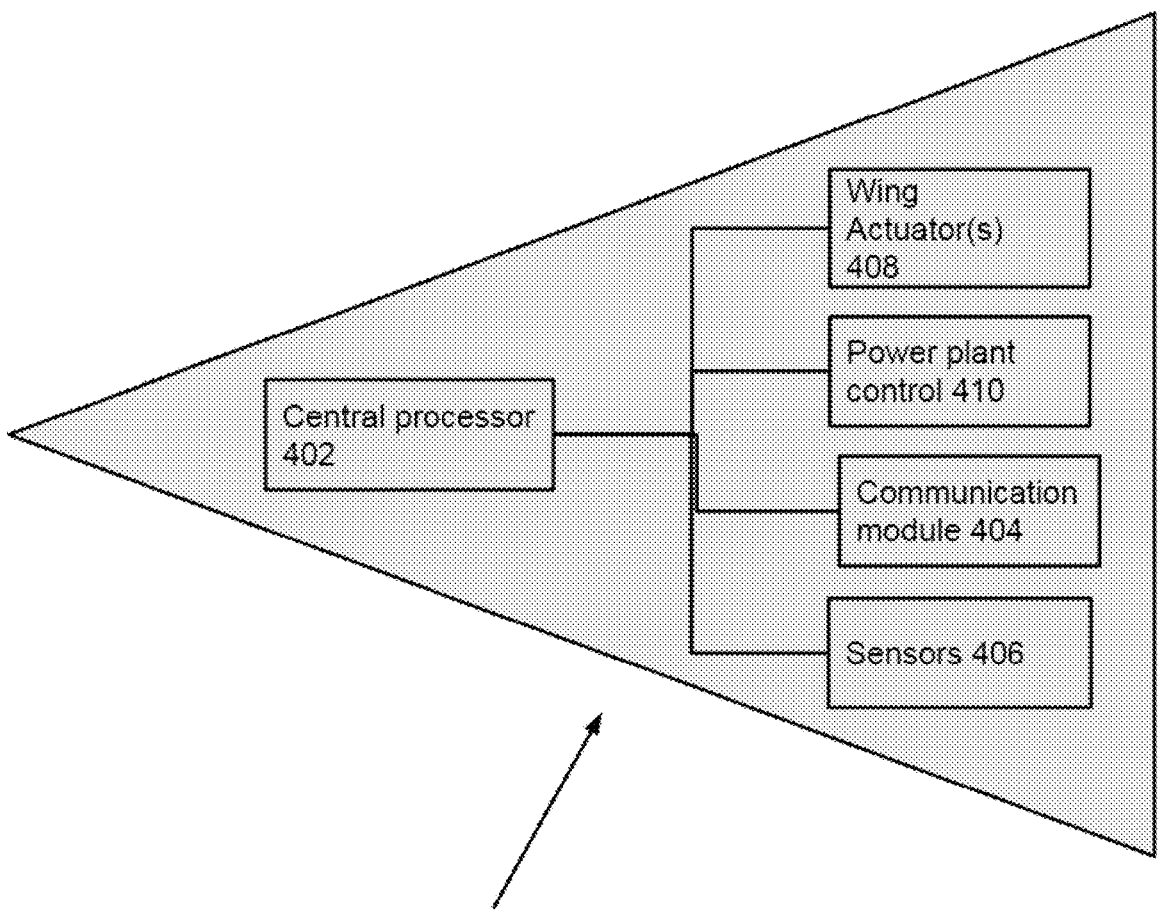
FIG. 4 is a block diagram of the control system of the airframe according to the present invention.

Turning to FIG. 4, the payload 113 of the airframe includes a central processor 402 that functions to receive and send signals to the control surfaces of the airframe. For example, the control processor 402 includes inputs and outputs for receiving sensor data (e.g. altimeters, airspeed indicators, and radar data, video and infrared cameras) obtained by sensors 406. Information obtained by the sensors 406 is processed by the processor 402 and used to control the power plant 103 through a power plant control device 410. The power plant control device 410 controls the thrust generated by the power plant 103. Additionally, the control processor 402 controls the activation of the wing extensions and expanders through the use of the wing actuator control device(s) 408. Additionally, the wing control actuator device is configured to control, ailerons and ruddervators in response to the sensors 406.

In one mode, the processor 402 operates the airframe 101 in a semi-autonomous manner, e.g. auto-pilot. Under semi-autonomous control, the airframe 101 is configured through software to implement a pre-planned route or path to an objective. The processor 402 is further configured to communicate data to a remote receiver, for example a ground control station, using the communication module 404. In a further refinement, the communication module 404 is used to receive flight instructions. For example, the airframe is remotely pilotable via the communications module 404. For instance, a set of software modules can be configured to cooperate with one another to provide a remote user the ability to steer the airframe and engage the wing actuators in response to environmental conditions and user necessity.

Each of these modules can comprise hardware, code executing in a computer, or both, that configure a machine such as the computing system to implement the functionality described herein. The functionality of these modules can be combined or further separated, as understood by persons of ordinary skill in the art, in analogous embodiments of the invention. The processor 402 of the described invention is configurable for connection to remote devices and computing devices. For example the processor 402 of the airframe system may, in one embodiment, be configured for communication with a mobile computing device, or connecting via the internet to a remote server or control device.

While this specification contains the details of many specific embodiments, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in a sequential order, or that all illustrated operations be performed in order to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

While the invention has been particularly shown and described with reference to a preferred embodiment thereof, it will be understood by those skilled in the art that various changes in form and details may be made therein without departing from the spirit and scope of the invention.

The invention claimed is:

1. A hybrid wing aircraft having,
an airframe in a flying wing configuration;
at least one hybrid wing member having at least an airframe end and an extended end, and leading and trailing edges, the airframe end being coupled to the airframe and having at least one forced air retaining cell;
an airframe actuator configured to cause the extension end of the hybrid wing member to move from a first position relative to the airframe to a second position relative to the airframe, wherein the second position is greater in distance from the airframe than the first position; and
a wing extension device coupled to at least one portion of the hybrid wing member, wherein the wing extension device is configured to extend from inside the hybrid wing member, a plurality of air-ram fabric sleeves during transition from vertical to horizontal flight.

2. The airframe of claim 1, wherein the airframe actuator is activated in response to a signal sent by a processor.

3. The airframe of claim 2, wherein the processor causes the activation in response to a measured air speed.

4. The airframe of claim 1, wherein the wing extension device causes the leading edge of the hybrid wing to be positioned perpendicular to a direction of forward travel.

5. The airframe of claim 1, wherein the wing extension device is activated in response to a signal sent by a processor.

6. The airframe of claim 1, further comprising at least three rotor driven ducted fan assemblies integral to the hybrid wing member.

7. The airframe of claim 1, wherein the hybrid wing member is a laminate wing.

8. The airframe of claim 1, wherein the hybrid wing member is rectangular, tapered or elliptical in shape.

9. The airframe of claim 1, wherein the control processor is configured to receive wireless instructions.

10. The airframe of claim 1, wherein the airframe end of the hybrid wing member is configured to pivot about an axis in at least one dimension.

11. The airframe of claim 1, wherein the at least one hybrid wing member is equipped with at least one of vortex generators, leading-edge slats or flaperons.

12. The airframe of claim 1, further comprising an expandable material affixed to the airframe and the hybrid wing member and configured to increase the surface area of hybrid wing when the hybrid wing member is in the second position relative to the airframe.

13. A hybrid wing autonomous aircraft having,
an airframe in a flying wing configuration,
at least one hybrid wing member having an airframe end and an extended end and having leading and trailing edges, the airframe end being coupled to the airframe,
an airframe actuator configured to cause the extension end of the hybrid wing member to move from a first position relative to the airframe to a second position relative to the airframe, wherein the second position is greater in distance from the airframe than the first position;
a wing extension device coupled to at least one portion of the hybrid wing member, the wing extension device configured to extend from the hybrid wing member a plurality of air-ram fabric sleeves,
a processor configured to control the plurality of control structures and airframe actuator in response to signals output by an air speed sensor;
a power plant configured to provide vertical and horizontal thrust; and
a fuel cell power source.

* * * * *